United States Patent Office 2,850,516
Patented Sept. 2, 1958

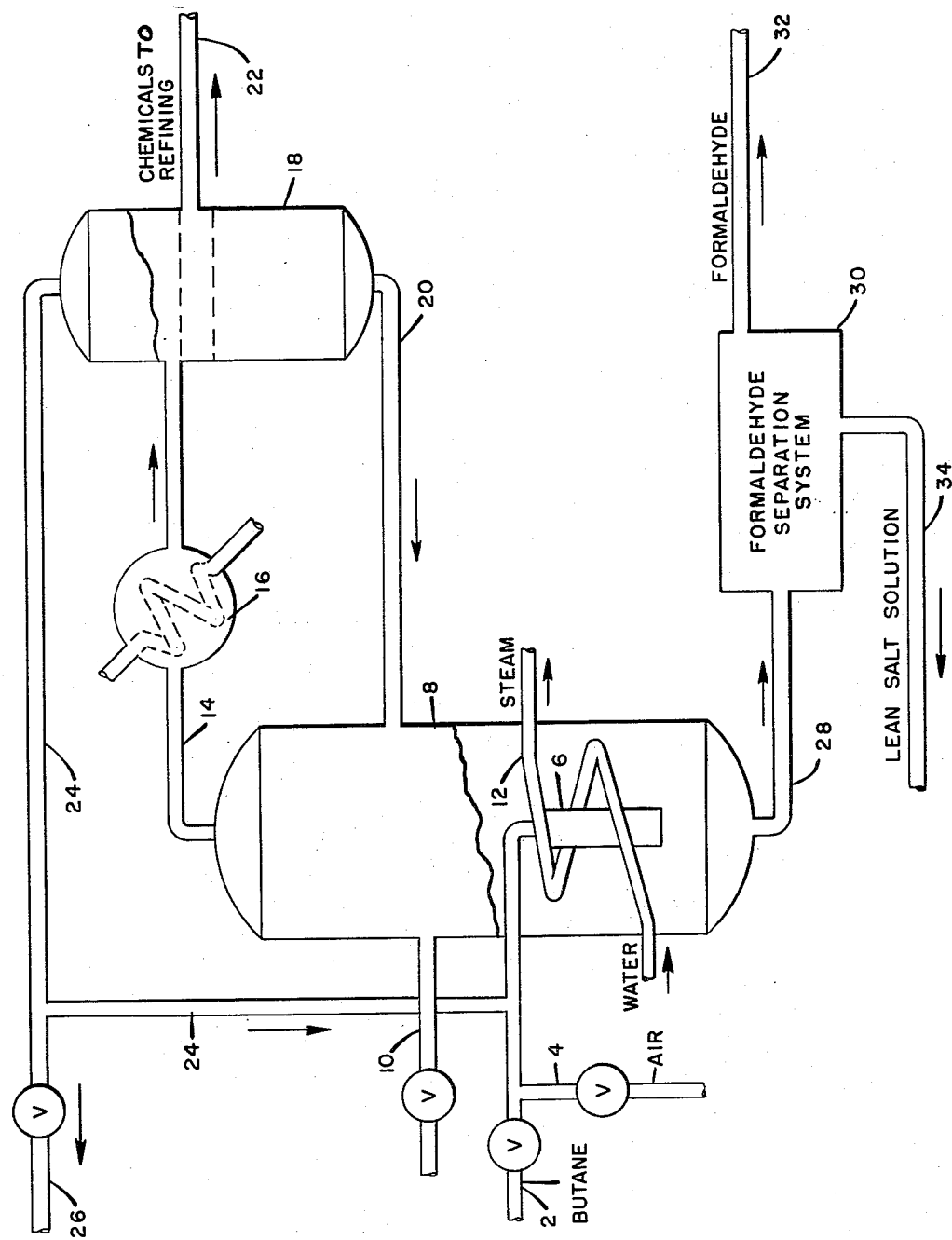

2,850,516

REMOVING OIL SOLUBLE OXYGENATED ORGANIC CHEMICALS FROM AQUEOUS MIXTURES

Buell O'Connor, Brownsville, Tex., assignor to Pan American Petroleum Corporation, a corporation of Delaware Application December 21, 1955, Serial No. 554,502

4 Claims. (Cl. 260—450)

The present invention relates to the separation of a component or components from non-volatile components present in mixtures thereof. More particularly it pertains to a method for accomplishing this object by a procedure which is not only capable of so doing but which is also capable of simultaneously synthesizing useful oxygenated organic chemicals.

While the principles taught herein find application in the recovery of volatile compounds from a wide variety of mixtures, the present description deals particularly with the problems encountered in recovering valuable chemicals from the oil stream produced by the hydrogenation of carbon monoxide in the presence of a fluidized alkali promoted catalyst under known synthesis conditions. Actually, this oil fraction obtained in the hydrocarbon synthesis process contains a rather wide variety of acids, carbonyl compounds (ketones and aldehydes), and alcohols together with a smaller proportion of esters. For example, in hydrocarbon synthesis plants designed to produce approximately 650,000 lbs. per day of liquid hydrocarbons, there are simultaneously produced along with this oil fraction about 76,000 lbs. of oil-soluble carbonyl compounds, about 61,700 lbs. of oil-soluble alcohols, and about 69,300 lbs. of oil-soluble acids. Because of their value as chemicals, it is desirable to separate these compounds from the oil stream as completely as possible. Also in the subsequent conversion of the aforesaid oil fraction into gasoline, it is imperative that such compounds either be removed from the oil or converted into substances such as, for example, unsaturated hydrocarbons, which can then be utilized in conjunction with the hydrocarbons originally synthesized to make high quality motor fuels.

Because of the close proximity in boiling points of these various oil-soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the nonacid oil-soluble chemicals and a lower aqueous layer containing the acids in the form of their corresponding salts together with an appreciable percentage, i. e., approximately 25 weight percent of nonacid chemicals which have been solubilized thereby and from about 10 to 20 weight percent of hydrocarbons, depending, of course, on the strength of the caustic solution initially added. While recovery of the acids from the aforesaid aqueous layer can be accomplished without substantial difficulty, the solubilized chemicals and hydrocarbons present a difficult problem, especially where it is desired to effect a substantially complete separation of chemicals from hydrocarbons. Further extraction of the neutral oil layer with salt solutions formerly used, i. e., high molecular weight salts or solutions of salts derived from neutralizing the entire acid component of the hydrocarbon synthesis oil, failed to result in satisfactory separation of chemicals from the oil. Thus, when extract solutions of these salts, i. e., chemically rich salt solutions obtained by extracting the neutral hydrocarbon synthesis oil with a lean salt solution, were subjected to a stripping operation to separate the dissolved chemicals from the salt solution, foaming within the column frequently became so excessive that further separation of the chemicals from the extract was either impossible or the capacity of the stripping column was seriously limited. This foaming is largely caused by the fact that in conventional procedures the rich salt solution, introduced near the top of the column, is diluted as it flows downwardly and is mixed with an aqueous reflux stream which is also introduced at a point near the top of the column. As a result, the diluted soap cannot be stripped at an economical rate without causing excessive foaming in the column. The aqueous reflux stream can, if desired, be returned to the reboiler section of the stripping column to avoid this undesirable dilution effect; however, the single stripping stage thus afforded results in less complete stripping of the soap as well as in lower chemicals recovery. The aforesaid water layer or aqueous reflux stream also can be stripped separately in an additional stripper to recover the chemicals. Obviously, however, this method is undesirable because of the cost of additional equipment.

A further disadvantage of processes previously employed to remove chemicals from their hydrocarbon solutions by the use of salt solutions of the aforesaid type resided in the fact that the chemical fraction obtained as a distillate from the stripping operation had a relatively high hydrocarbon content. In an effort to reduce the quantity of hydrocarbons present in the chemicals at this stage of the separation process, a deoiling step was introduced prior to the stripping operation in which the chemically rich salt extract solution was countercurrently extracted with a suitable light hydrocarbon such as, for example, butane or pentane, for the purpose of removing from said extract the majority, if not all, of the hydrocarbon impurities dissolved therein. While this procedure aided in substantially reducing the hydrocarbon content of the chemical fraction recovered, the foaming problem encountered in the stripping operation remained just as serious as before.

Accordingly, it is an object of my invention to provide a method for recovering oil-soluble oxygenated organic chemicals from hydrocarbon solutions thereof by the use of salt solutions of the type contemplated herein under conditions such that the deoiling step previously referred to may be either completely eliminated or employed only on a very substantially reduced scale as compared with procedures formerly used. A further object of my invention is to provide a method for stripping of a mixture having volatile and nonvolatile components wherein the heat required for the purpose of volatilizing the portion of said mixture is supplied by effecting partial oxidation of a suitable hydrocarbon in the vapor phase, said oxidation step being conducted below the surface of said mixture under conditions of submerged combustion.

In accordance with an embodiment of my invention, submerged partial combustion of a suitably proportioned hydrocarbon-oxygen mixture is effected in a chemically rich salt solution obtained by extracting a hydrocarbon synthesis oil fraction with an aqueous salt solution in the manner mentioned above. Heat generated by the partial oxidation step serves to volatilize both the chemicals in the original salt extract and the chemicals produced by means of partial oxidation of the hydrocarbons. The vaporous products from partial oxidation generated in the submerged combustion step have a latent heat of vaporization less than that of water. Accordingly, under such conditions it is possible at temperatures below the boiling point of the salt solution to remove as a distillate or overhead, all of the chemicals and hydrocarbon contaminants together with an aqueous azeotrope of chemicals and/or hydrocarbons, the water present in the azeotropes representing the principal quantity of water passing overhead. Because of the relatively small concentration of water within the upper half of the stripping column very little, if any, foaming is encountered. The stripper may be operated under pressures of from 25 to 100 p. s. i., preferably at about 50 p. s. i. For a given temperature the partial pressure of the vaporous partial oxidation products can be arbitrarily fixed by establishing the pressure in the presence of said products. Thus, at atmospheric pressure and at a temperature below the boiling point of a 40 weight percent carboxylic acid salt of the aforesaid type, for example 220° F., the generation of said products within the aforesaid extract rich in chemicals causes the latter to be removed from the liquid bottoms together with azeotropic water. On the other hand, when such salt solutions are stripped at higher temperatures by boiling water out of the salt solution, the vapor velocities within the column are dependent on the rate at which the water is vaporized. However, when gaseous products resulting from the submerged partial combustion of hydrocarbons, contact such solutions in accordance with the conditions contemplated by my invention, it is possible to achieve a relatively wide range of vapor velocities. Because the latent heat of vaporization of gaseous products formed in partial combustion as provided herein is substantially less than that of water, they require less heat to acquire a given vapor velocity than when water vapor alone is present in the solution being stripped. Accordingly, it will be apparent that the conditions used in operating the stripping column may vary rather widely and that it is possible to carry out my invention merely by conducting the aforesaid submerged partial combustion step by controlling, within relatively wide limits, the flow rate of the gaseous feed mixture employed in said step. While maximum vapor velocities are secured at the boiling point of the mixture by stripping, and although the process of my invention can be employed under such conditions, I ordinarily prefer to effect the aforesaid stripping operation at temperatures ranging from about 10° to about 50° F. below the boiling point of the mixture for optimum efficiency, and preferably from about 20° to about 35° F. below said boiling point. In this connection the aqueous solutions which are stripped in accordance with my invention may boil up to from about 240° to about 250° F.; however, in stripping the salt solutions generally worked with, the concentration of the salt therein rarely runs in excess of about 40 weight percent. Such solutions boil in the vicinity of from about 225° to about 230° F. at atmospheric pressure.

For a given mixture to be stripped, the submerged partial combustion step should be conducted in such a manner that the gaseous products resulting from said stripping constitute from about 25 to about 75 volume percent of the total vapor component in the stripping column, and preferably from about 45 to about 55 volume percent thereof. Higher concentrations of such gaseous products in the vapor component ordinarily result in relatively inefficient stripping conditions. The rate at which the gaseous products are produced in the aforesaid submerged partial combustion step may vary widely. However, in general, it should not exceed from about 60 to 80 percent of the stripping column's flooding velocity. Usually from about 30 to about 50 percent of the flooding velocity of the column is an adequate rate at which said gaseous products should be formed and introduced into the stripping system.

In carrying out the submerged partial combustion of hydrocarbon in accordance with my invention hot gaseous products usually at a temperature of about 750° to about 1000° F. emerge from an open end of a suitable reactor extending into the chemical rich aqueous salt extract. On contact of the gaseous products with the extract they are immediately quenched. Depending on the volume of products formed by this submerged partial combustion, the temperature of said extract can be conveniently controlled. If considered necessary or desirable, auxiliary cooling surfaces in contact with the salt solution may be used.

For the partial combustion step, I generally prefer to employ a feed stock containing normally gaseous paraffin hydrocarbons or olefins such as those present in petroleum refinery gases. Natural gas or normally gaseous hydrocarbons recovered from the absorption towers of natural gasoline plants may likewise be employed. The hydrocarbon is first preheated, usually to a temperature of about 300° to about 600° F. and thereafter combined with a stream of oxygen or a suitable oxygen containing gas that has likewise been preheated to a temperature of 300 to 600° F. and the resulting mixture passed into a suitable reaction zone where the reaction is allowed to proceed adiabatically until a temperature of from about 750° to about 1000° F., at least.

The feed employed in the submerged partial combustion step generally should be on the hydrocarbon rich side, i. e., from about 30 to about 80 percent hydrocarbon or more, and from about 2 to about 10 percent oxygen. While preheat temperatures for the main feed streams to the reaction zone usually range from about 300 to about 600° F. lower or higher preheat temperatures may be employed depending primarily on the composition of the total feed. Thus, when employing a hydrocarbon rich feed, the involved reaction is more readily initiated in higher concentrations of oxygen and hence can be effected at a lower temperature. For example, with total feeds having a composition within the range mentioned above, the preheat required may be from about 300° to about 400° F., such preheat temperatures apply to operation in the normal pressure range, i. e., from about 25 to 100 p. s. i. The preheat temperatures required will be somewhat higher at pressures below the aforesaid normal range.

Recycle ratios of separator tail gas to fresh feed may vary widely with ratios of from about 1:1 to about 20:1 being ordinarily preferred. If desired, however, higher recycle ratios may be employed. Pressures at which the reaction is effected may likewise vary and generally may range from about atmospheric up to pressures not substantially exceeding about 100 p. s. i. Contact times in the reaction zone for the partial combustion step may range from about 0.1 to about 10 seconds, however, I normally prefer to employ contact times ranging from about 0.5 to about 1.5 seconds.

The process of my invention may be further illustrated by reference to the accompanying drawing wherein butane under 50 pounds pressure in line 2, previously preheated to a temperature of about 500° F., is mixed with air at 500° F. in line 4. The resulting mixture is then introduced into reactor 6 where reaction of the gaseous components is initiated generating a temperature within the reaction zone not substantially in excess of about 900° F. Stripping column 8 is fed through line 10 with an aqueous extract obtained by contacting neutral oil from hydrocarbon synthesis with an aqueous solution containing from about 30 to about 40 weight percent of an alkali metal salt of an aliphatic carboxylic acid having from five to twelve carbon atoms. Extractant solutions of this type are obtained by neutralization of the free acids in hydrocarbon synthesis oil with an alkali metal compound, ammonia, or a substituted ammonium compound, recovering the resulting salts thereof and thereafter diluting with water to the desired concentrations. With the aid of coil 12, the temperature of the salt solution being stripped is maintained at about 225° F. Gaseous products resulting from partial oxidation of butane and which emerge from the base of reactor 6 into direct contact with the aforesaid aqueous salt extract serve to entrain or carry overhead large quantities of chemicals together with hydrocarbons and azeotropic water, even when the salt extract is at a temperature of from 20° to about 35° F. below its boiling point. Overhead a stream is withdrawn through line 14 and condenser 16 which consists essentially of hydrocarbons and oil-soluble chemicals together with azeotropic water. This stream is introduced into separator 18 and allowed to stratify into an upper organic layer and lower aqueous layer. The latter is recycled to an intermediate point in the stripping tower via line 20 so that more efficient stripping of oil-soluble chemicals from the water may be effected. The organic layer is withdrawn through line 22 and subjected to refining methods outside the scope of my invention. From the top of separator 18 uncondensed stripping gases are withdrawn and a portion thereof recycled through line 24 to line 2. The remainder may be either exhausted to the atmosphere through line 26 or used as plant fuel, if desired.

As the stripping process progresses, a bottoms portion is withdrawn through line 28. This stream consists essentially of formaldehyde and water soluble salts, of carboxylic acids ranging from five to twelve carbon atoms; the former having been produced in the aforesaid submerged partial combustion step. To separate formaldehyde from the aqueous salt solution the aforesaid bottoms stream is sent to a separation system 30. Since both the lean salt and formaldehyde under the circumstances behave as non-volatile components, conventional methods for concentrating and purifying formaldehyde are of no value. Therefore, in order to obtain the lean salt solution free from formaldehyde, I employ a separation procedure of the type described and claimed in U. S. 2,565,569 McCants. By this process an aqueous solution of formaldehyde together with nonvolatile impurities is introduced into a fractionating column in which the pressure is regulated to provide a top column temperature above about 170° F. At temperatures above this level the equilibrium between monomeric and polymeric formaldehyde favors the monomeric form. Also the reaction products of formaldehyde with water begin to break down at about this temperature. In accordance with the procedure described in the aforesaid patent, methanol is introduced at a point near the top of the column to in effect create a methanol reflux in the upper portion thereof. Under such conditions, water present in the vaporous mixture of formaldehyde is rejected down the column with a mixture of formaldehyde and methanol passing overhead together with very little, if any water. Methanol is unique in its ability to reflux water down a column while permitting formaldehyde to pass out of the column under the conditions taught in the aforesaid patent. Methanol forms no azeotrope with water and because of its complete miscibility therewith no hetero-azeotrope is formed. While methanol reacts with formaldehyde the reaction product is unstable under the conditions of distillation, thus permitting formaldehyde to pass overhead.

Using the formaldehyde separation scheme briefly outlined immediately above, formaldehyde is withdrawn from the system through line 32. Lean salt solution is withdrawn from the separation system through line 34 and a portion thereof returned to the previously mentioned extraction step to eventually provide feed to stripper 8 through line 10. The remainder of the lean salt solution thus obtained is recovered from the system as a net salt make. If desired, the latter may be acidified and free carboxylic acids recovered therefrom in a known manner.

It will be obvious to those skilled in the art to which the present invention relates that numerous modifications in manipulative steps may be made without departing from the scope thereof. In general, it may be said that my invention contemplates the recovery of chemicals from an aqueous mixture thereof by vaporization of said chemicals, the heat required for such vaporization being furnished by effecting within said mixture submerged partial combustion of hydrocarbons as generally outlined above.

I claim:

1. In a process for the recovery of oil-soluble oxygenated organic chemicals from an aqueous mixture thereof with aliphatic carboxylic acid salts having from five to twelve carbon atoms by subjecting said mixture to a stripping operation, the steps which comprise supplying the heat required for said stripping operation by effecting partial oxidation of a normally gaseous hydrocarbon below the surface of said mixture, whereby said hydrocarbon is partially converted into chemicals of the same class as said oil-soluble oxygenated compounds, said partial oxidation being carried out under known conditions in a zone at least partially submerged within said mixture and maintained at a temperature ranging from 750° to 1,000° F., and bringing the resulting hot products of said partial oxidation into direct contact with said mixture which is maintained at a temperature of from about 50° F. below the boiling point thereof up to not more than about 10° F. below the boiling point of said mixture, whereby the aforesaid oil-soluble oxygenated organic chemicals, together with the chemicals produced by said partial oxidation step are removed from said mixture owing to the fact that the latent heat of vaporization of said oil-soluble chemicals and chemicals produced by said partial oxidation step is less than that of water.

2. In a process for the recovery of oil-soluble oxygenated organic chemicals from an aqueous mixture thereof with aliphatic carboxylic acid salts having from five to twelve carbon atoms by subjecting said mixture to a stripping operation, the steps which comprise supplying the heat required for said stripping operation by effecting partial oxidation of a normally gaseous hydrocarbon below the surface of said mixture, whereby said hydrocarbon is partially converted into chemicals of the same class as said oil-soluble oxygenated compounds, said partial oxidation being carried out under known conditions in a zone at least partially submerged within said mixture and maintained at a temperature ranging from 750° to 1,000° F., and bringing the resulting hot products of said partial oxidation into direct contact with said mixture which is maintained at a temperature of from about 35° F. below the boiling point thereof up to not more than about 20° F. below the boiling point of said mixture, whereby the aforesaid oil-soluble oxygenated organic chemicals, together with the chemicals produced by said partial oxidation step are removed from said mixture owing to the fact that the latent heat of vaporization of said oil-soluble chemicals and chemicals produced by said partial oxidation step is less than that of water.

3. In a process for the recovery of nonacid oil-soluble oxygenated organic chemicals present in the liquid hydrocarbon fraction produced by the hydrogenation of carbon monoxide in the presence of an alkali promoted fluidized iron catalyst under known conditions whereby said fraction is subjected to extraction in an extraction tower with an aqueous solution of an alkali metal salt of an aliphatic carboxylic acid having from five to twelve carbon atoms to obtain an aqueous extract rich in said chemicals and containing as contaminants solubilized hydrocarbons from said liquid hydrocarbon fraction and recovering said chemicals from said extract by subjecting the latter to a stripping operation in a fractionating column, the steps which comprise supplying the heat required for said operation by effecting partial oxidation of a normally gaseous hydrocarbon below the surface of said extract, said partial oxidation being carried out under known conditions in a zone maintained at a temperature ranging from about 750° to about 1000° F. to produce chemicals of the same class as said nonacid oil-soluble chemicals, and bringing the resulting hot products of said partial oxidation into direct contact with said extract which is maintained at a temperature of from about 50° F. below the boiling point thereof up to not more than about 10° F. below the boiling point of said extract, whereby the aforesaid chemicals originally present in said extract together with chemicals produced by said partial oxidation step are removed overhead from said mixture owing to the fact that the latent heat of vaporization of said chemicals originally present and said chemicals produced by said partial oxidation step is less than that of water.

4. The process of claim 3 in which the nonvolatile components in the bottoms portion of said column consisting primarily of alkali metal salt of a carboxylic acid having from five to twelve carbon atoms and formaldehyde produced in the aforesaid partial oxidation step is removed in the form of an aqueous mixture and the formaldehyde separated therefrom.

References Cited in the file of this patent

UNITED STATES PATENTS

| | | |
|---|---|---|
| 2,565,569 | McCants | Aug. 28, 1951 |
| 2,570,215 | Dice | Oct. 9, 1951 |
| 2,645,655 | Pearce | July 14, 1953 |
| 2,704,120 | Peterson | Mar. 15, 1955 |

FOREIGN PATENTS

| | | |
|---|---|---|
| 349,567 | Great Britain | May 13, 1931 |